J. B. CHERNEY.
START AND STOP MECHANISM FOR TALKING MACHINES.
APPLICATION FILED APR. 6, 1915.
1,301,905.                                     Patented Apr. 29, 1919.
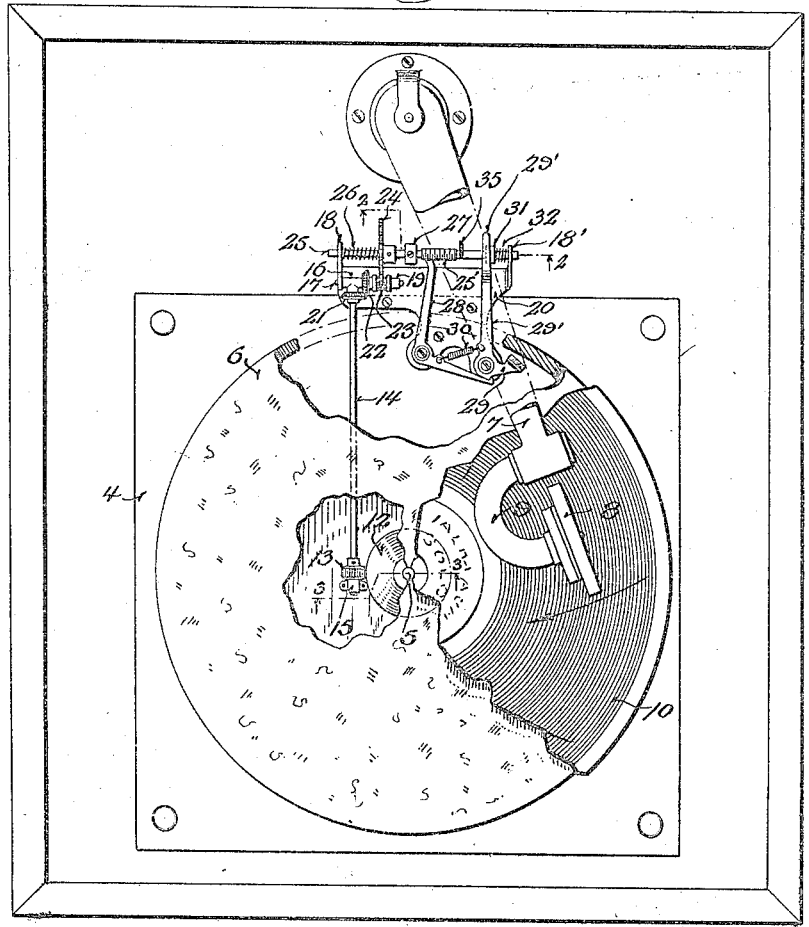
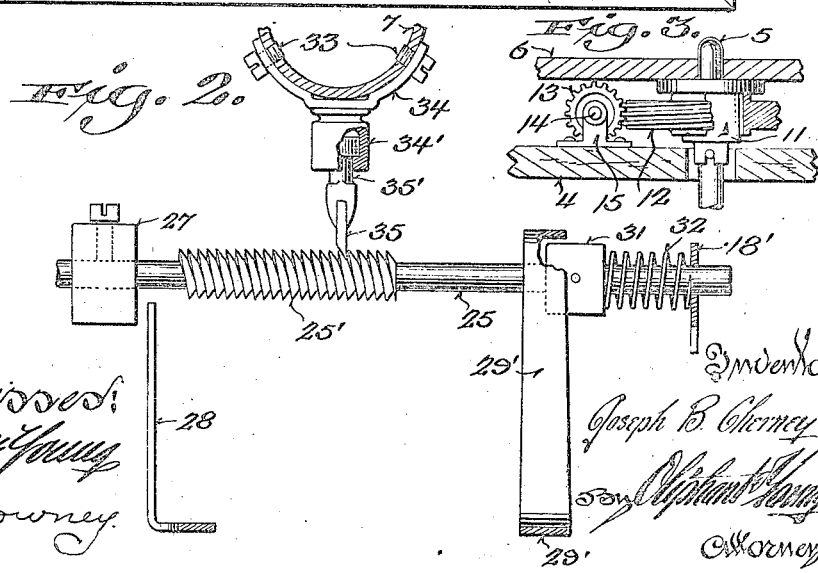

UNITED STATES PATENT OFFICE.

JOSEPH B. CHERNEY, OF MILWAUKEE, WISCONSIN, ASSIGNOR, BY MESNE ASSIGNMENTS, TO COLUMBIA GRAPHOPHONE MANUFACTURING COMPANY, OF BRIDGEPORT, CONNECTICUT, A CORPORATION OF DELAWARE.

START AND STOP MECHANISM FOR TALKING-MACHINES.

1,301,905.　　　　　Specification of Letters Patent.　　Patented Apr. 29, 1919.

Application filed April 6, 1915. Serial No. 19,515.

*To all whom it may concern:*

Be it known that I, JOSEPH B. CHERNEY, a citizen of the United States, and resident of Milwaukee, in the county of Milwaukee and State of Wisconsin, have invented certain new and useful Improvements in Start and Stop Mechanism for Talking-Machines; and I do hereby declare that the following is a full, clear, and exact description thereof.

My invention relates to start and stop mechanism, and it has for an object the provision of a simple, economical and efficient mechanism of this type which is adapted to stop automatically, and also preferably start automatically, the rotary record-support of a talking machine.

Stated broadly, the invention comprises the combination with a rotating element and a traveling element coacting therewith, of a stop device, shown as a brake member, means rendered operative by the stopping of the traveling element for effecting the movement of said stop device into stopping position, and means operated by the return of said traveling element to starting position for moving said stop device into starting position. In the preferred embodiment of the invention, the stop device is provided with a detent for maintaining the same in inoperative position, and the detent is tripped by the reaction of a bodily displaceable member driven independently of the traveling element and coacting with an abutment operatively connected with said traveling element.

The invention is capable of receiving a variety of mechanical expressions one of which is shown on the accompanying drawing, but it is to be expressly understood that the drawing is for purposes of illustration only and is not to be construed as a definition of the limits of the invention, reference being had to the appended claims for that purpose.

Referring to said drawing:—

Figure 1 is a plan view of automatic start-and-stop mechanism in accordance with my invention applied to a disk graphophone, parts of the graphophone being broken away;

Fig. 2 is a detail of the start-and-stop mechanism partly in section, the view being indicated by line 2—2 in Fig. 1; and Fig. 3 is another detail of said start-and-stop mechanism partly in section, the view being indicated by line 3—3 in Fig. 1.

Referring by numerals to the drawings, 4 indicates the motor board, 5 the driven spindle, 6 the turntable, 7 the tone-arm, 8 the sound-box and 9 a tubular arm extending from said sound-box and shown in pivotal connection with said tone-arm. A fragment 10 of a record-disk is shown on the turntable, centered as usual by the spindle aforesaid. The several parts need not take the form illustrated, however, as they may be of any suitable construction.

The turn-table, together with the record thereon, constitutes a rotatable element, and the tone-arm, together with the sound-box, constitutes a traveling element. The tone-arm and sound-box, constituting the traveling element, are normally propelled across the record because of the engagement of the needle of the sound-box with the grooves of the record.

Fast on the hub 11 of the turntable in the form of the invention shown on the drawing, is a worm 12 in mesh with a worm-pinion 13 fast on a shaft 14 for which a bearing 15 is provided on the motor board. Another bearing for this shaft is provided by a T-shaped member 16 supported on an arbor 17 having its bearings in a flange 18 and a stud 19 on a bracket 20 that is fastened by screws to the motor board. A bevel-gear 21 fast on the shaft 14 meshes with a similar gear 22 fast on the arbor, and a trundle-wheel 23 is also fast on said arbor. The trundle-wheel meshes with a spur-wheel 24 fast on a partly screw-threaded shaft 25 having its bearings in the flange 18 and another flange 18' on said bracket 20. The shaft 25 has longitudinal play in its bearings and a spring 26 is arranged on said shaft between the bracket-flange 18 and the spur-wheel 24. A collar 27 is adjustably secured on the shaft 25 between the spur-wheel 24 and the screw-threaded enlargement 25' of said shaft, and opposing the shaft-collar 27 is the operating member of a suitable start-and-stop device. In the form shown, the start-and-stop device consists of a brake adapted to act directly upon the turn-table, but it will be understood that other start-and-stop devices, such as are well known, may be used; and it will further be understood that when a brake is used, it may be arranged differently from the way shown. As illustrated, the operating member for the start-and-stop device consists of a bell-crank 28 pivotally mounted on the bracket 20, the inner end of the bell-crank being shaped to constitute a latch engageable with a turntable-brake 29 also pivotally mounted on said bracket. A spring 30 connects the latch-arm of the bell-crank 28 with the arm 29' of said brake. Another collar 31 is shown fast on the shaft 25, and a spring 32 is arranged on said shaft between said collar and the bracket-flange 18'.

Rigidly mounted on the underside of the tone-arm 7, as by screws 33, is a bracket 34 carrying a depending tubular socket 34' in which is mounted for loose vertical play the headed shank 35' of a blade 35 that may engage the screw-thread on shaft 25 as the needle of the sound-box traverses the record disk.

The blade 35 constitutes a member or abutment operatively connected to the traveling element, and the threaded shaft 25 constitutes a member operatively connected to the rotating element, these two members being adapted to continuously engage each other during a portion of the movement of the said rotating and traveling elements. It is to be understood, however, that these members need not take the form illustrated as they may be of any construction suitable to effect the function to be explained.

The stop device, here shown as a brake, is caused to operate by a departure of the speed of advance of the traveling element from its normal speed. When use is made of records of the ordinary sort, as illustrated in the drawing, the change or departure which takes place from the normal speed of advance of the traveling element is a diminution of speed or stopping, caused by the needle of the sound-box reaching the end of the record groove. The invention is not limited, however, to this particular departure from the normal speed. In the embodiment of the invention shown, inward movement of the tone-arm 7 causes an eventual engagement of the blade or abutment 35 with the screw-thread on the shaft 25, the pitch of which is substantially the same as the pitch of the record groove. So long as the needle of the sound-box continues to traverse the record, said blade or abutment runs in the thread on shaft 25 without operative effect, but when it ceases to advance, as at the completion of the record, and the tone-arm and abutment become stationary, the continued rotation of shaft 25 causes the latter to move toward the right (Fig. 1) against the resistance of spring 32 owing to the reaction of the screw-thread on the blade or abutment 35. This longitudinal movement of the shaft causes an engagement of the shaft-collar 27 with the opposing end of the bell-crank 28 to thereby trip the latch-arm of said bell-crank out of engagement with the brake 29, whereupon a contraction of the previously expanded spring 30 results in a setting of said brake. The shaft 25 is thereafter restored to normal position by the action of the spring or springs.

The brake 29 is retracted from contact with the opposing turn-table flange by outward movement of the tone-arm 7 to cause engagement of the blade 35 with the arm 29', said brake being thereby withdrawn and caught by the latch-arm of the bell-crank 28 as shown in Fig. 1.

The springs 26 and 32 cushion vibratory longitudinal movement of the shaft 25 that results from the playing of a record, and the blade 35 has vertical play to permit movement into and out of operative engagement with the threads on said shaft.

While the illustrated embodiment of the invention has been described with considerable detail, it is to be understood that the invention is capable of receiving other mechanical expressions some of which will readily suggest themselves to those skilled in the art, while certain features thereof are capable of use without other features thereof. Reference is therefore to be had to the claims hereto appended for a definition of the limits of the invention.

I claim:

1. The combination of a rotatable element, a traveling element coacting therewith, a brake for controlling the starting and stopping of the rotatable element, a latch automatically engageable with said brake, a rotary and slidable latch-retractor in gear with said rotatable element, and a device movable with the traveling element and operative to withdraw the brake by movement in one direction and to actuate the latch-retractor upon cessation of movement of the traveling element in the opposite direction.

2. The combination of a rotatable element, a traveling element coacting therewith, a brake for controlling the starting and stopping of the rotatable element, a latch automatically engageable with said brake, a rotary and slidable latch-retractor in gear with said rotatable element, a device movable with the traveling element and operative to withdraw the brake by movement in one direction and to actuate the latch-retractor upon cessation of movement of the traveling element in the opposite direction, and means cushioning vibratory movement of said latch-retractor.

3. The combination of a rotatable element, a traveling element coacting therewith, a brake for controlling the starting and stopping of the rotatable element, a latch automatically engageable with said brake, a rotary and slidable latch-retractor in gear with said rotatable element, and a vertically movable device movable with the traveling element and operative to withdraw the brake by movement in one direction and to actuate the latch-retractor upon cessation of movement of the traveling element in the opposite direction.

4. The combination of a rotatable element, a traveling element coacting therewith, a brake for controlling the starting and stopping of the rotatable element, a latch automatically engageable with said brake, a rotary and slidable latch-retractor in gear with said rotatable element, a vertically movable device movable with the traveling element and operative to withdraw the brake by movement in one direction and to actuate the latch-retractor upon cessation of movement of the traveling element in the opposite direction, and means cushioning vibratory movement of said latch-retractor.

5. The combination of a rotatable element, a traveling element coacting therewith, a blade depending from the traveling element, a brake for the rotatable element having an arm in the path of movement of said blade to starting position, a latch automatically engageable with said brake, a screw-threaded slidable shaft in gear with said rotatable element, said blade engaging said screw-thread during opposite movement of said traveling element, and latch-retracting means movable with said shaft.

6. The combination of a rotatable element, a traveling element coacting therewith, a blade depending from the traveling element, a brake for the rotatable element having an arm in the path of movement of said blade to starting position, a latch automatically engageable with said brake, a screw-threaded slidable shaft in gear with said rotatable element, said blade engaging said screw-thread during opposite movement of said traveling element, and latch-retracting means adjustable on said shaft.

7. The combination of a rotatable element, a traveling element coacting therewith, a blade depending from the traveling element, a brake for the rotatable element having an arm in the path of movement of said blade to starting position, a latch automatically engageable with said brake, a screw-threaded slidable shaft in gear with said rotatable element, said blade engaging said screw-thread during opposite movement of said traveling element, latch-retracting means movable with said shaft, and means cushioning vibratory movement of said shaft.

8. The combination of a rotatable element, a traveling element coacting therewith, a depending, vertically movable blade movable with the traveling element, a brake for the rotatable element having an arm in the path of movement of said blade to starting postion, a latch automatically engageable with said brake, a screw-threaded slidable shaft in gear with said rotatable element, said blade engaging said screw-thread during opposite movement of said traveling element, and latch-retracting means movable with said shaft.

9. The combination of a rotatable element, a traveling element coacting therewith, a depending, vertically movable blade movable with the traveling element, a brake for the rotatable element having an arm in the path of movement of said blade to starting position, a latch automatically engageable with said brake, a screw-threaded slidable shaft in gear with said rotatable element, said blade engaging said screw-thread during opposite movement of said traveling element, latch-retracting means movable with said shaft, and means cushioning vibratory movement of said shaft.

10. The combination of a rotatable element, a traveling element coacting therewith, a blade depending from the traveling element, a brake for the rotatable element having an arm in the path of movement of said blade to starting position, a bell-crank having a brake-engaging latch arm in spring connection with said first-mentioned arm, a screw-threaded slidable shaft in gear with said rotatable element, said blade engaging said screw-thread during opposite movement of said traveling element, and a collar movable with said shaft and adapted to operate said bell-crank.

11. The combination with a rotating element and a traveling element coacting therewith, of a start-and-stop mechanism comprising a member driven by the traveling element, and a member driven independently thereof, one of the said members while remaining in engagement with the other serving to effect the stopping of the rotating element upon the stopping of the traveling element and the other of the said members when disengaged from the first being operative to effect the starting of the rotating element.

12. The combination with a rotating element and a traveling element coacting therewith, of a start-and-stop mechanism comprising an abutment movable with the traveling element, moving means reacting against the abutment upon the stopping of the traveling element to effect the stopping of the rotating element and means positioned to be engaged by the abutment to effect the starting of the rotating element.

13. The combination with a rotating element and a traveling element coacting therewith, of a start-and-stop mechanism comprising a member normally held against bodily movement, an abutment movable with the traveling element, means operating by reaction against the abutment upon the stopping of the traveling element to move the said member to effect the stopping of the rotating element and means positioned to be engaged by the abutment to effect the starting of the rotating element.

14. The combination with a rotating element and a traveling element coacting therewith, of a start-and-stop mechanism comprising an abutment movable with the traveling element, means comprising a rotating screw reacting against the abutment upon the stopping of the traveling element to effect the stopping of the rotating element and means positioned to be engaged by the abutment to effect the starting of the rotating element.

15. The combination with a rotating element and a traveling element coacting therewith, of an abutment movable with the traveling element, a stop device, a detent for maintaining said stop device in inoperative position, and a feed-screw operating by reaction against said abutment to trip said detent.

16. The combination with a rotating element and a traveling element coacting therewith, of an abutment movable with the traveling element, a stop device, a detent for maintaining said stop device in inoperative position, a longitudinally movable feed-screw displaceable by reaction against said abutment, and means operated by the displacement of said feed-screw to trip said detent.

17. The combination with a rotating element and a traveling element coacting therewith, of an abutment movable with the traveling element, a stop device, a detent for maintaining said stop device in inoperative position, a longitudinally movable feed-screw displaceable by reaction against said abutment, means operated by the displacement of said feed-screw to trip said detent, and means for restoring said feed-screw to normal position.

18. The combination with a rotating element and a traveling element coacting therewith, of an abutment movable with the traveling element, a stop device, displaceable means operating by reaction against said abutment to effect the actuation of said stop device, and means independent of said stop device for automatically restoring said displaceable means to normal position.

19. The combination with a rotating element and a traveling element coacting therewith, of an abutment movable with the traveling element, a stop device, longitudinally displaceable means operating by reaction against said abutment to effect the actuation of said stop device, and resilient means for restoring said displaceable means to normal position.

20. The combination with a rotating element and a traveling element coacting therewith, of an abutment movable with the traveling element, a stop device, a feed-screw displaceable by reaction against said abutment to effect the actuation of said stop device, and means for restoring said feed-screw to normal position.

21. The combination with a rotating element and a traveling element coöperating therewith, of an abutment movable with the traveling element, a stop device, a detent for maintaining said stop device in inoperative position, means normally rotated independently of said traveling element and displaceable by reaction against said abutment to trip said detent, and means for restoring said displaceable means to normal position.

22. The combination with a rotating element and a traveling element coöperating therewith, of an abutment movable with the traveling element, a stop device, a detent for maintaining said stop device in inoperative position, longitudinally displaceable means operating by reaction against said abutment to trip said detent, and means for restoring said displaceable means to normal position.

In testimony that I claim the foregoing I have hereunto set my hand at Milwaukee, in the county of Milwaukee and State of Wisconsin, in the presence of two witnesses.

JOS. B. CHERNEY.

Witnesses:
N. E. OLIPHANT,
M. E. DOWNEY.